United States Patent
Meyers

(12) 
(10) Patent No.: US 6,690,828 B2
(45) Date of Patent: Feb. 10, 2004

(54) METHOD FOR REPRESENTING AND COMPARING DIGITAL IMAGES

(76) Inventor: Gary Elliott Meyers, 13017 Highpoint Curve, Burnsville, MN (US) 55337

(*) Notice: Subject to any disclaimer, the term of this patent is extended or adjusted under 35 U.S.C. 154(b) by 225 days.

(21) Appl. No.: 09/829,145

(22) Filed: Apr. 9, 2001

(65) Prior Publication Data
US 2002/0146176 A1 Oct. 10, 2002

(51) Int. Cl.[7] .............................................. G06K 9/68
(52) U.S. Cl. ........................ 382/218; 358/515; 358/520; 358/521; 358/532; 382/164; 382/165; 382/173; 382/195; 382/225; 382/274
(58) Field of Search ................................ 382/162–173, 382/218, 225, 195, 275; 358/515–522, 532

(56) References Cited

U.S. PATENT DOCUMENTS

| | | | | |
|---|---|---|---|---|
| 5,329,379 A | * | 7/1994 | Rodriguez et al. | 382/167 |
| 5,331,442 A | * | 7/1994 | Sorimachi | 358/532 |
| 5,745,595 A | * | 4/1998 | Yamada et al. | 382/170 |
| 5,784,488 A | * | 7/1998 | Kuwata | 382/176 |
| 5,926,578 A | * | 7/1999 | Fukase et al. | 382/266 |
| 5,982,926 A | * | 11/1999 | Kuo et al. | 382/167 |
| 6,061,471 A | * | 5/2000 | Coleman, Jr. | 382/274 |
| 6,111,982 A | * | 8/2000 | Adachi | 382/176 |
| 6,249,603 B1 | * | 6/2001 | Rucklidge | 382/169 |
| 6,320,981 B1 | * | 11/2001 | Yada | 382/168 |
| 6,324,309 B1 | * | 11/2001 | Tokuyama et al. | 382/300 |
| 6,343,146 B1 | * | 1/2002 | Tsuruoka et al. | 382/163 |
| 6,389,169 B1 | * | 5/2002 | Stark et al. | 382/225 |

OTHER PUBLICATIONS

"Similarity–Based Image Segmentation," *Determination of Brain/Liquor Ratio by Alzheimer Dementia*, Institut für Bildverarbeitung und angewandte Informatik e.V., Leipzig.
Colin C. Venters and Dr. Matthew Cooper; "A Review of Content–Based Image Retrieval Systems," University of Manchester.
Christos Faloutsos; "Fast Searching of Multimedia Objects by Content," Carnegie Mellon University, Pittsburgh, Pa.
"Computer Vision and Pattern Recognition Group," Home Page, Universiy of Bonn/CSIII John E. Johnson, Jr.; "Microscopy Research and Technique," *Lucis*.
"Attrasoft ImageFinder" Advertisement, *Get Software*.
P. Thévenaz, U.E. Ruttimann and M. Unser; "A Pyramid Approach to Subpixel Registration Based on Intensity," IEEE Transactions on Image Processing, Jan. 1998, vol. 7, No. 1, pp. 27–41.
Theano Nikitas; "Imaging Goes Quicksilver," *Digital Output, The Business Guide for Electronic Publishers*.
David Bradburn Aragon; "Recognition Technology and Pattern Analysis," Data Analysis Page.
"Multimedia Indexing and Retrieval Bibliography," Center for Intelligent Information Retrieval.

\* cited by examiner

Primary Examiner—Bhavesh M. Mehta
Assistant Examiner—Gregory M Desire
(74) *Attorney, Agent, or Firm*—Moore, Hansen & Sumner

(57) ABSTRACT

A method of generating a compact representation of a digital image is described. A digital image is converted to a square bitmap and divided into a plurality of cells. Each cell is subdivided into a plurality of regions. A minimum intensity region and a maximum intensity region in each cell are identified in each set of the plurality of cells. Cell representation data is generated for each cell in each set of cells based on the positions of the minimum intensity region and the maximum intensity region in the cell. Combining all of the cell representation data in each set of cells for the image creates a compact representation of the original digital image.

A method of comparing cell representation data is also described. Cell representation data for a collection of source images is organized into a database. A search of the database identifies candidate images that are at least minimally similar to a target image. The target image is then compared directly to each identified candidate image and a similarity score for each candidate image is calculated and recorded.

19 Claims, 7 Drawing Sheets

METHOD FOR REPRESENTING AND COMPARING DIGITAL IMAGES

CROSS-REFERENCE TO RELATED APPLICATIONS

None.

BACKGROUND OF THE INVENTION

This invention relates to a method for representing digital images in a manner that enables different images to be compared with each other. When digital images are stored in an image database, it is difficult to remember which images have been stored and where each one is located. When an individual adds a new image, it would be useful to be able to quickly compare the new image with the stored images and determine whether the database already includes the same image or one that is similar to it.

Similar images may arise from several different sources. For example, imaging software may be used to add text, crop, or increase the contrast of digital photographs. In addition, two images may display the same subject from a slightly different perspective or with different exposure settings. Events such as these result in images that are not identical but are similar to each other. It would be helpful to have a system that informs the user whether or not a similar image is already stored in the database, thereby saving both the user's time and storage space. Furthermore, by identifying related images, such a system assists the image management process by automatically organizing and grouping related images together.

Many image management applications allow the user to manually associate text with the images in the database, typically in a comment or description field. Users can then search for images based on this stored text (e.g., display all of the images that have a "roses" comment). Content-based image retrieval systems have been developed for identifying similar images through complex image processing techniques. These image comparison algorithms are often computationally intensive and take a considerable amount of time to return their results. The methods used in these systems frequently involve color, shape, and texture calculations, require extensive parameter adjustment by the user, and employ time-consuming data processing techniques. There is a need for a simpler and faster method for comparing digital images with each other in order to find similar images.

BRIEF SUMMARY OF THE INVENTION

A method for generating a representation of a digital image according to the present invention involves converting the original image into a square bitmap and then dividing that bitmap into a plurality of square cells. Each cell is further subdivided into a plurality of square regions. Both the region with the minimum intensity (brightness) and the region with the maximum intensity are found for each cell. The minimum intensity value, the maximum intensity value, and the relative location of the minimum intensity region to the maximum intensity region make up each cell's representation data. The method combines the representation data for each of the cells in the square bitmap in order to create a compact representation of the original digital image.

The key relationship in the method of this invention is that visually similar images generate similar cell representation data. This relatively small amount of information is used by the method to compare images and to search for similar images in an image library. The method of the present invention is less complex and more efficient than prior art techniques for representing and comparing digital images with each other. Images are accurately represented by a small amount of information and compared with each other in a relatively quick and robust manner.

DETAILED DESCRIPTION OF THE INVENTION

For the purposes of this disclosure, source image is defined as the image or portion of a larger image from which cell representation data is calculated. Target image generically identifies the source image that is the subject of the current similar image search. Candidate images are those images that are being examined to determine their similarity with the current target image. A body of images including the representation data for the target and candidate images is referred to as an image library or an image database.

When an image is presented to this method, its cell representation data is calculated and, if desired, the user's database is then searched for similar images. Alternatively, the method may be used to calculate the cell representation data for the target and candidate images each time that the user wishes to perform a search, thereby making it optional for the user to maintain a persistent image database.

Figure 1:
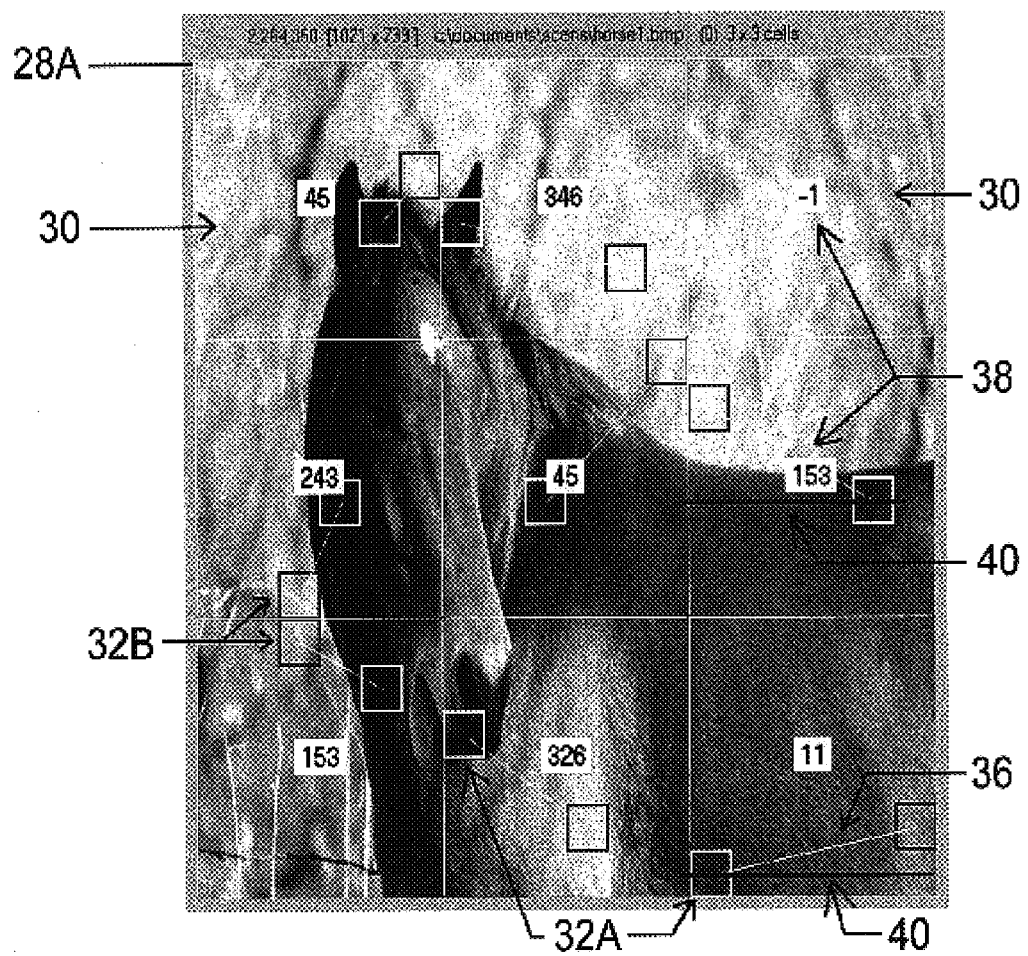
FIG. 1 shows a digital image converted to a square bitmap and then divided into cells according to the present invention, with the minimum and maximum intensity regions highlighted.

FIG. 1 shows a square bitmap image 28A generated by applying the method of the present invention to a rectangular (1021 by 739 pixels) source image. (When referring to bitmaps operated on by the present invention generally, the reference number "28" is used, and when referring to a specific bitmap, a letter is appended to the number "28".) Bitmap 28A happens to have been divided by the method into nine cells 30. A few of the cells have been marked to indicate the relative location of their minimum intensity (darkest) region 32A and their maximum intensity (brightest) region 32B. These regions 32A and 32B are connected by a line 36 drawn from the darkest region to the brightest region. (When referring to intensity regions in general, the reference number "32" is used, and when referring to minimum and maximum intensity regions, the letters "A" and "B", respectively, are appended to the reference number "32".) The cell intensity angle 38 is displayed as the number of degrees (0 to 359) that line 36 forms in relation to a horizontal reference line 40. If there is not sufficient contrast in the cell to determine a definite brightest and darkest region, the intensity angle value for that cell is set to a "low contrast" constant value. This value is preferably −1, as shown in the upper right corner of FIG. 1, although other values may be used.

It is to be understood that the method of the present invention may be adapted to incorporate image properties other than intensity, either alone or in combination with intensity values. Such properties include, but are not limited to, color, hue, saturation, value, luminance, and chrominance. In addition, when the method is using image intensity to calculate cell representation data and it encounters an image with a predominance of low contrast cells 30, it dynamically increases the contrast of the cells in the bitmap image 28 and then recalculates the cell representation data for that image. This helps to prevent "washed out" images from being mistakenly classified as similar to each other when they actually have significant differences.

Figure 2:
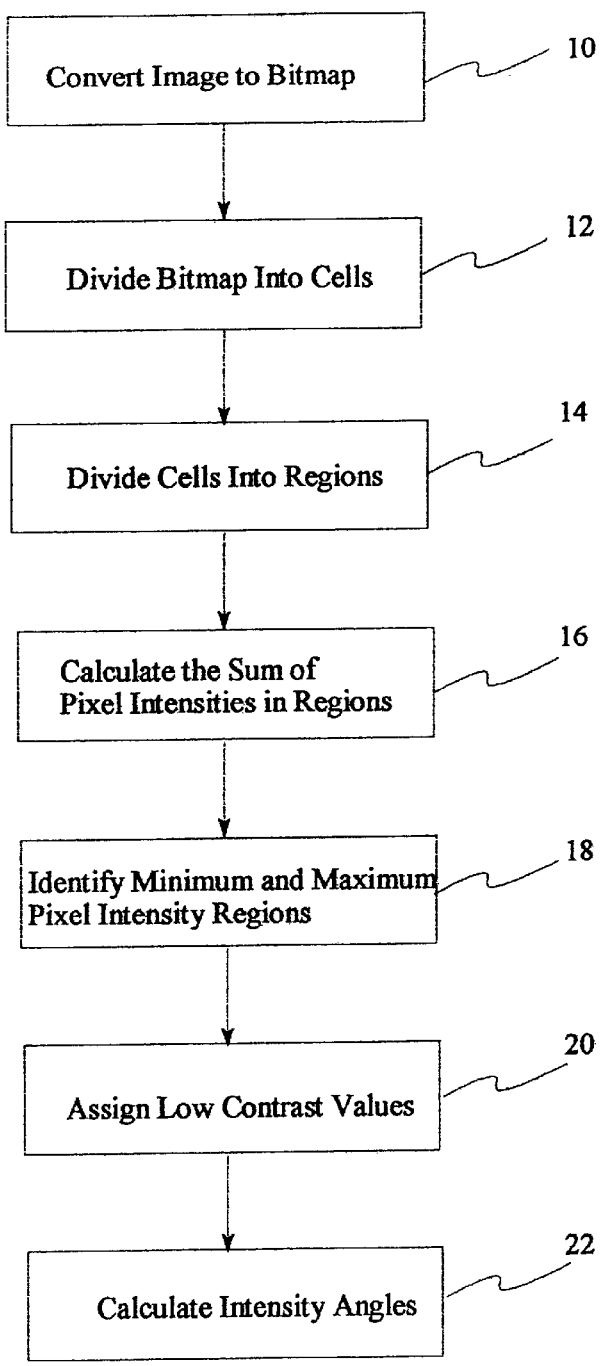
FIG. 2 is a flow diagram illustrating a preferred method of generating a representation of a digital image according to the present invention.

FIG. 2 is a flow diagram illustrating a preferred method of generating a representation of a digital image according to the present invention. A digital image is presented to the method in its native file format (.jpg, .bmp, .tif or other format) and then converted into a "device-independent bitmap", to use the Microsoft Windows™ graphical programming terminology (Block 10 in FIG. 2). When the source image is converted into the square bitmap 28, it may be that it is stretched and/or compressed in order to create a square representation of the original source image. For example, a 942×617 pixel source image might be compressed down to a 500×500 pixel bitmap 28 (although other dimensions may be used), resulting in more shortening in the horizontal direction than in the vertical direction. The result is that the original source image, regardless of its dimensions, is presented to the method as a square bitmap 28. In a preferred embodiment, the "StretchBlt" graphical function from the Windows™ operating system is used in this bitmap conversion, but other image processing routines could perform the same task.

The square bitmap 28 is then divided into various numbers of cells 30 for subsequent analysis (Block 12). Preferably, the bitmap 28 is divided into successively finer cell grids, perhaps beginning with a 3 by 3 grid (9 cells) and proceeding up to perhaps a 9 by 9 grid (81 cells). Each grid approximates a two-dimensional array of cells and each dimension of the array is conveniently referred to as a cell dimension. Preferably the cells of each grid are numbered so that the cell at the upper left corner of the grid is identified as cell (1,1). The remaining cells are numbered similarly, each cell being identified by its position in the grid using its row and column as the identifiers. The additional data that will be generated from each successive division of the bitmap 28 is preferably used iteratively in the comparison process, with the similarity scores of the respective grid sizes being conglomerated to yield a more accurate result.

In Block 14 of FIG. 2, each of the bitmap's 28 cells 30 is further subdivided into square regions 32. The regions 32 are preferably implemented as a 6 by 6 grid, for a total of 36 regions 32 in each cell 30, but this number of regions may be varied.

In Block 16, each of the regions 32 is processed to sum up the total intensity of the pixels contained in that region. In an implementation that uses 24-bit color depth, this step involves summing the three bytes that represent each pixel's red, blue, and green components. Optional weighting may be applied to adjust the red, blue, and green values according to various formulas that have been defined for calculating pixel intensity. This process calculates an integer value representing the overall intensity (brightness) of each region 32. Note that, as stated above, other image properties may be used in place of or in addition to pixel intensity. The total pixel intensity of each region 32 is compared with the cell's 30 current minimum and maximum pixel intensity. If the pixel intensity of a region 32 is the new minimum or maximum for the cell 30, its value is saved as the cell's new minimum or maximum intensity value. The relative X and Y coordinates of that region 32 in the cell 30 are also saved, so that the locations of the darkest 32A and brightest 32B regions in the cell 30 may be easily retrieved. This step continues until the total pixel intensities of all of the regions 32 in each cell 30 have been calculated. If there is not sufficient contrast in a cell 30 to determine a definite darkest region 32A and brightest region 32B, the value for that cell 30 is set to the arbitrarily defined "low contrast" constant value Block 20.

If a definite darkest region 32A and a definite brightest region 32B are found in a cell 30, the angle formed between the horizontal reference line 40 and a line 36 from the darkest region 32A to the brightest region 32B in the cell 30 is calculated. This angle is referred to as the intensity angle for the cell 30 Block 22. This angle calculation uses the X and Y coordinates of the minimum intensity region 32A and the maximum intensity region 32B which were found in each cell 30 in the step represented by Block 18. The horizontal reference line 40 passes through the minimum intensity region 32A. The intensity angle is preferably calculated by starting at the reference line 40 and moving in a counterclockwise direction from the minimum intensity region 32A to the maximum intensity region 32B. The angle magnitudes are preferably represented as integers ranging from 0 to 359, but the unit of measurement could instead be radian values that are either encoded as integers or expressed as floating point numbers.

The method of the present invention is not dependent on a particular computer file format of the original source image. The method can analyze true color images (16.7 million colors, 24-bit color depth), as well as all other color depths, as long as the relative intensity (brightness) of the image's pixels can determined. Similarly, the method can process both color and black-and-white images, because in a preferred implementation it is primarily concerned with the intensity of the image's pixels, not their color. The method is preferably performed with a personal computer using the Microsoft Windows™ operating system, although other computing devices and operating environments may be used.

As described above, the method of the present invention calculates an intensity angle or assigns the "low contrast" constant for each of the plurality of cells 30 in the square bitmap 28. These intensity angle values are the core cell representation data that this method uses for comparing images, although the minimum and maximum region intensity sum from each cell may also be stored and used in addition to the intensity angle. Additional image data may also be collected, other values may be calculated, and other processing steps may be performed in an image comparison and retrieval system.

For digital images that are visually similar, the method of the present invention has been shown to calculate similar intensity angle values for the corresponding cells between the images. This is true even if the images have been changed with an image editor (e.g., increasing the overall red color balance), saved with various levels of data compression (thus creating digital image files of various sizes), or reformatted to different image dimensions. This method enables the process of comparing digital images to be automated and enables the retrieval of similar images from an image database.

Figure 3A:
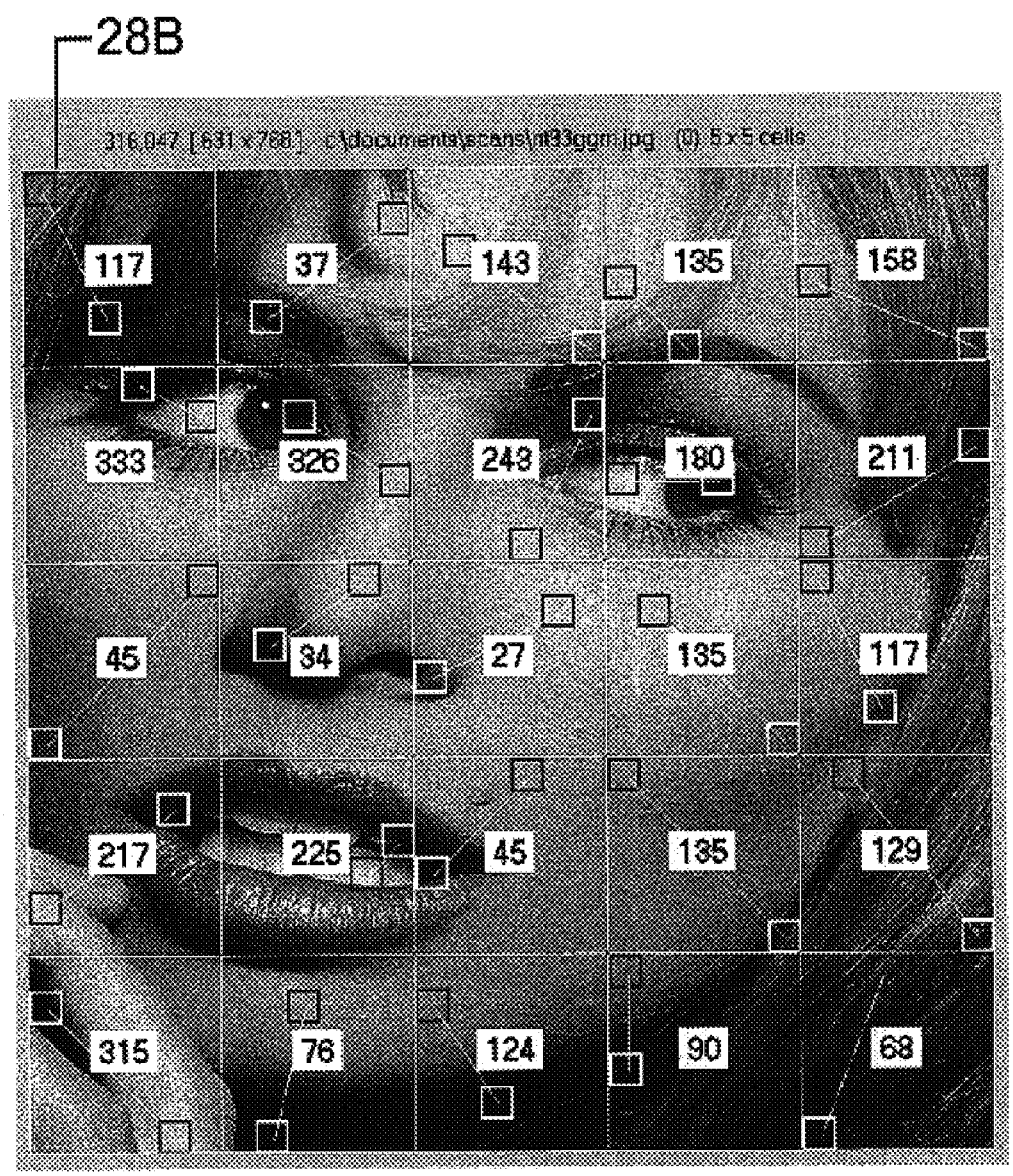
FIG. 3A shows a bitmap image generated by applying the present invention to a first version of a source image.
Figure 3B:
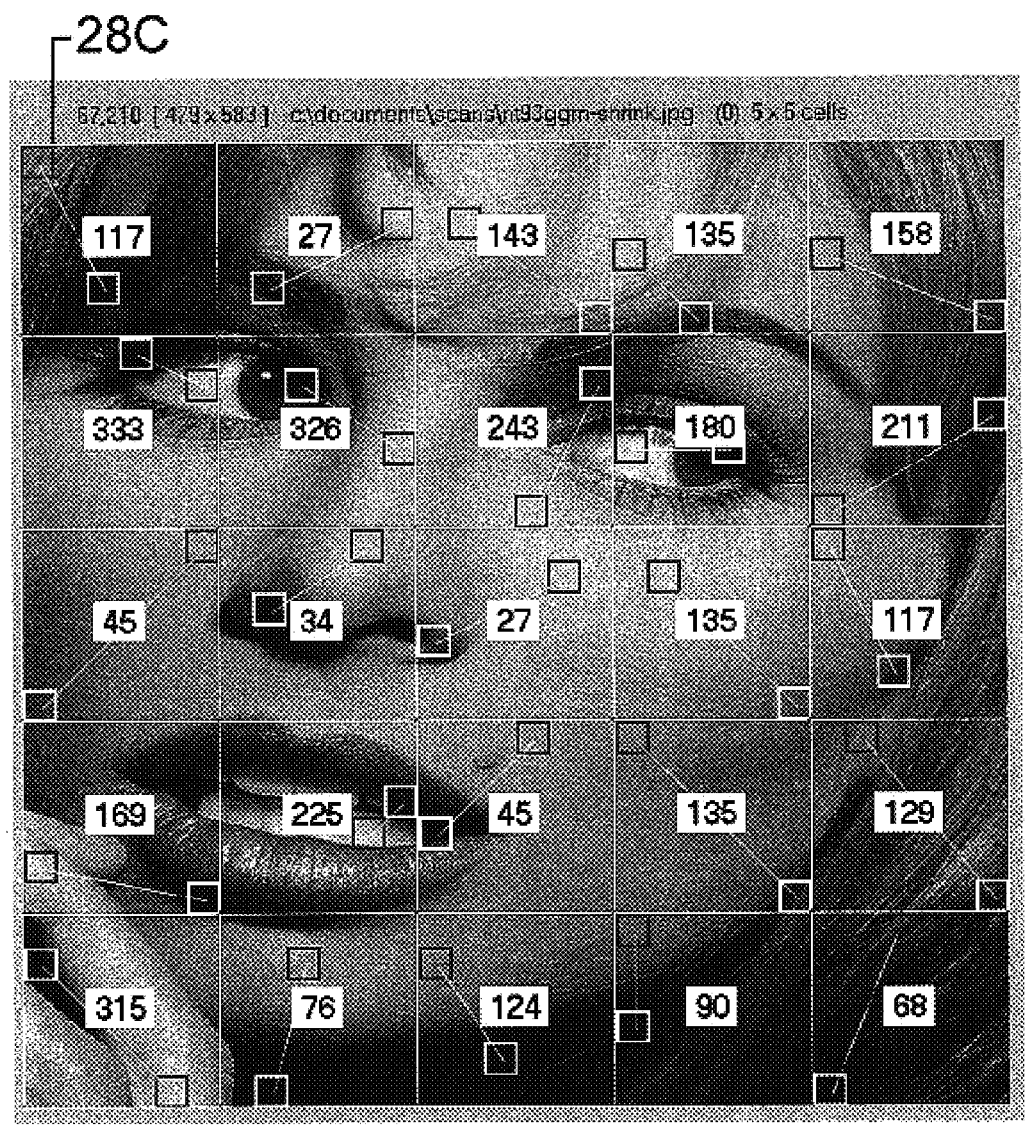
FIG. 3B shows a bitmap image generated by applying the present invention to a second version of the source image for FIG. 3A.
Figure 3C:
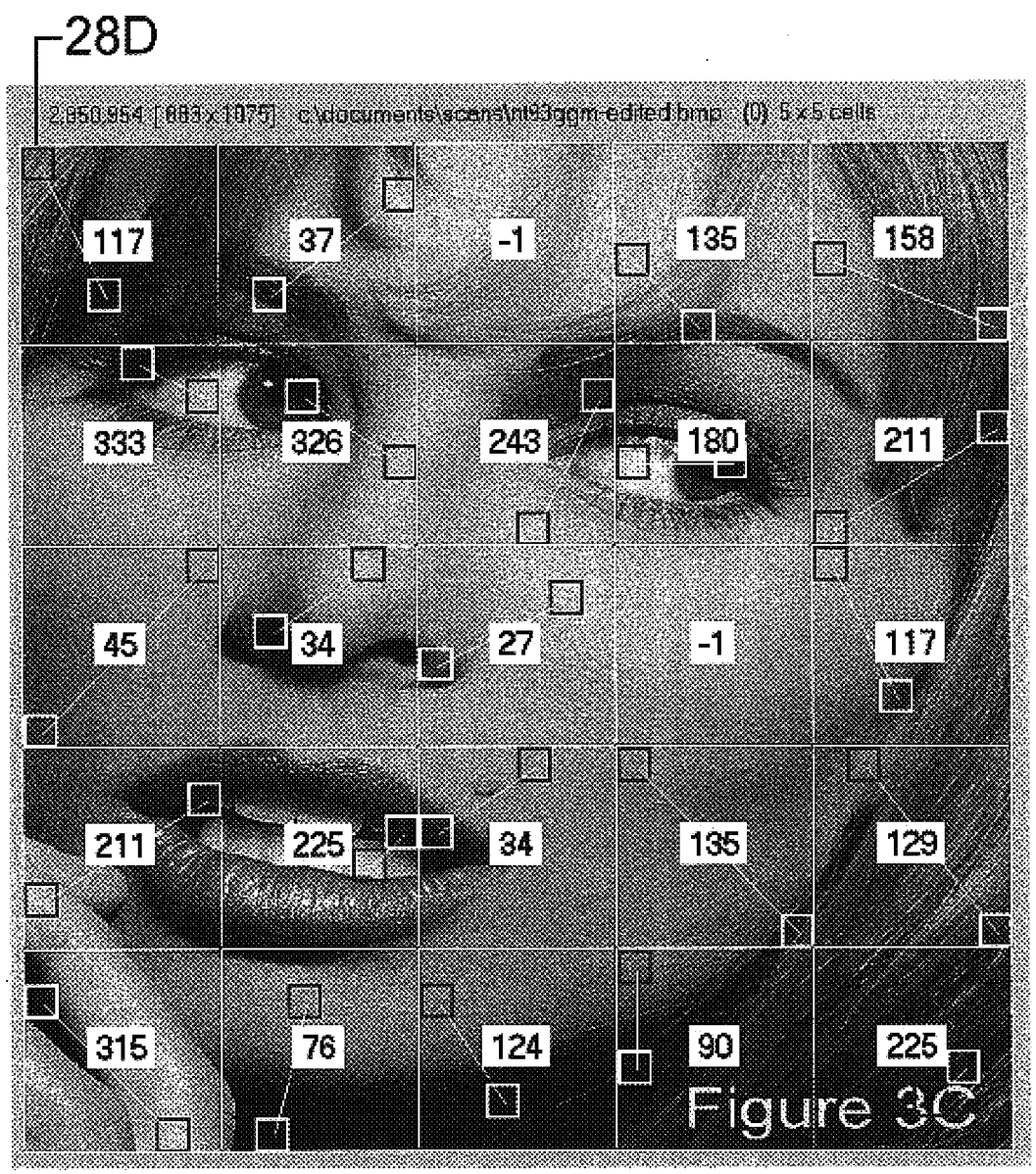
FIG. 3C shows a bitmap image generated by applying the present invention to a third version of the source image for FIG. 3A.

FIGS. 3A to 3C show three square bitmap images 28 generated by applying the present invention to three different versions of a source image. Bitmap image 28B, shown in FIG. 3A, is derived from the original 316,047-byte jpeg (.jpg) source image. FIG. 3B shows bitmap image 28C, which is derived from a 67,210-byte jpeg source image that is a compressed version, smaller in both file size and image dimensions, of the source image for FIG. 3A. FIG. 3C shows bitmap image 28D, which is derived from a 2,850,954-byte bitmap image (a .bmp file, not .jpg) that is another version of the source image for FIG. 3A. Various modifications were made to create the source image for FIG. 3C, including increasing the image dimensions, adding text, changing the file type, decreasing the contrast, and increasing the red color balance.

A comparison of the corresponding cells in the three different bitmap images 28B, 28C, and 28D in FIGS. 3A, 3B, and 3C reveals that the cell representation data for the corresponding cells are mostly identical or similar. Various techniques may be used to detect matching images and determine the degree of similarity between a target image and a collection of candidate images. For example, an angle range can be established to identify matching cells (e.g., the intensity angle of each cell in the target image, plus or minus 10 degrees). Then if the intensity angle for the corresponding cell in the candidate image is within the specified angle range, the two cells 30 are considered to be matching cells. A minimum threshold for the number of cells that must match may be specified in order to indicate matching images (e.g., 21 out of 25 matching cells are required). Another technique for finding similar images, described below, involves calculating a "similarity score" for each image by summing the differences between the corresponding cells of the target image and each candidate image. Other techniques for identifying similar images by analyzing the cell representation data may also be used. While the database of cell representation data may be generated each time that a search is performed, it is preferable to create the database when the image library is itself created and then update the cell representation data database when images are added to or removed from the image library.

When comparing images, it can be useful to focus attention on certain areas of the image. For example, many photo processors provide an index image that consists of an array of small "thumbnail" images of the full-sized images in the customer's order. By selecting one of the thumbnail images as the target image, a user may search an image library for images that are similar to the selected portion of the index image. Selecting the target image for a search may be accomplished by applying other types of cropping to a source image, thereby limiting the definition of the bitmap image 28 to just the selected portion of the source image. In addition, cell representation data 38 for a bitmap image 28 may be weighted so that the comparison process increases or decreases the importance of certain differences between the target image and each candidate image, rather than treating equally the differences in cell representation data values.

Figure 4:
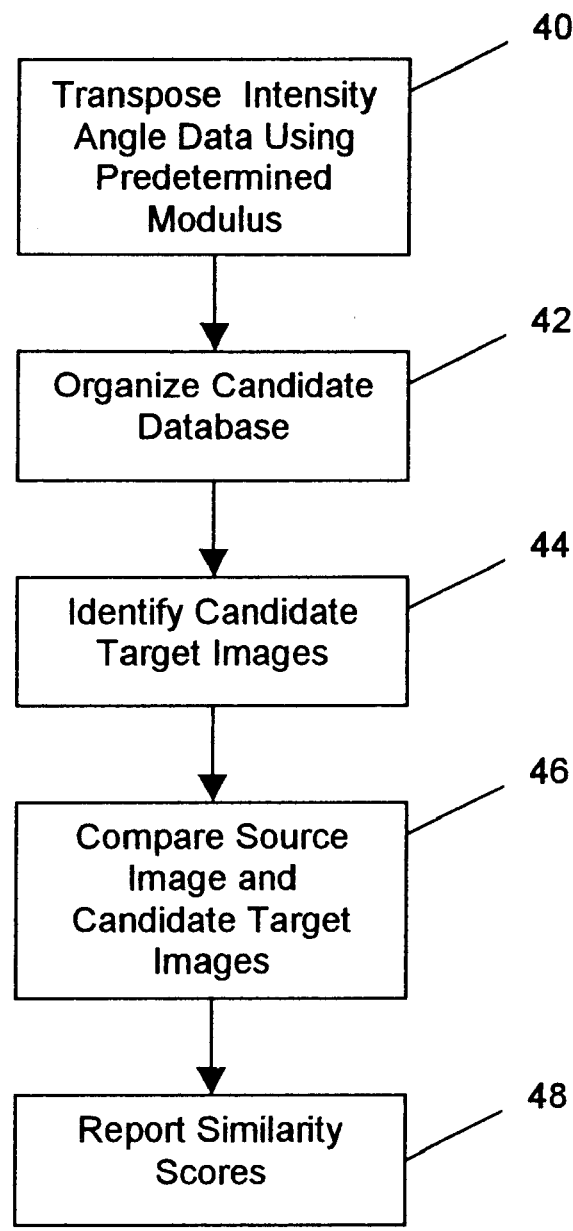
FIG. 4 is a flow diagram illustrating a method of comparing representations of target and candidate images.

With reference to FIG. 4, one procedure for calculating the similarity of target and candidate images is set forth. The comparison process is undertaken using cell representation data 38 that is derived as described in conjunction with FIG. 2. In this procedure, it is useful to transpose an image's intensity angles onto a somewhat smaller scale, to reduce the time and memory that are necessary to perform a similar image search Block 40. In one exemplary embodiment of the method of the present invention, original intensity angles in the range of 0 to 359 degrees are transposed using a modulus of 4 to scale the values to an intensity angle index range of 0 to 89. In addition, the "low contrast" values are transposed to an intensity angle index value of 90. Note that this transposition step is not a required step and may be omitted where so desired.

The user's image database is preferably organized according to the intensity angle values of the various cells in the source images and more preferably, according to the transposed intensity angle indexes described above. In this particular example of the method, ninety-one angle index categories 50 are maintained in the database (see FIG. 5), one for each intensity angle index from 0 to 90. Each angle index category 50 comprises one or more two-dimensional arrays 52. At most, there may be one of these arrays for each cell dimension into which the source images have been divided, but fewer arrays may be used. The arrays 52 are indexed in the same manner as the image cell grids, so, for example, position 1,1 in an array with a certain cell dimension corresponds to the upper left corner of the associated cell grid. It is to be understood that while this step of organizing the image database may be useful in implementing the method of the present invention, it is optional in that an entire cell representation data database may be accessed and searched each time an image is to be compared.

Each array 52 identifies all of the source images in the database that have calculated the same given intensity angle index from their cell representation data in the cell grid that corresponds to the array 52. For example, and with reference to FIG. 5, array position (1,1) of angle index category 0 identifies each image in the database that has an intensity angle index of 0 in cell (1,1) of the bitmap image 28 grid.

Figure 5:
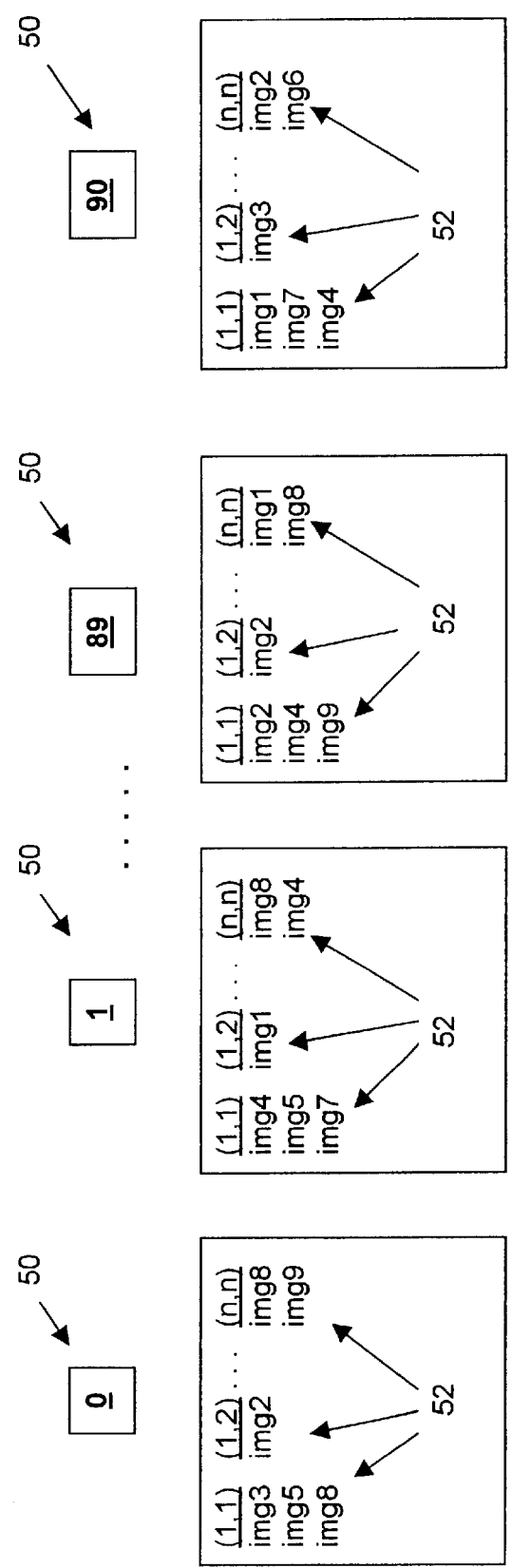
FIG. 5 is a schematic diagram showing the organizational structure of one embodiment of an image database.

In the example of FIG. 5, of the images in the image library, source images img3, img5, and img8 all have an intensity angle index of 0 in cell (1,1). As can be appreciated, such a data structure may be quickly searched to identify candidate images that contain at least one cell that has an intensity angle index identical or similar to that of the given target image.

In order to implement the method of the present invention in an efficient manner, it is desirable to avoid scanning an entire image library when searching for similar images. At the same time, however, it is vital to avoid the omission of potentially similar images when performing a similar image search. Accordingly, the first step in one method for searching a database of cell representation data involves the identification of candidate images that have at least some similarity with the current target image. This step selects as candidate images all of the images in the database that have at least one point of similarity with the target image. Every image that passes this test has a cell 30 with cell representation data 38 that is the same as, or within a specified deviation from, the cell representation data 38 of the corresponding cell 30 in the target image.

The searching algorithm described above is used to scan the cell representation database and generate a list of candidate images for the current target image. This step is indicated at 44 in FIG. 4. For each of the candidate images that pass this less restrictive benchmark, a complete cell-by-cell comparison is performed across all of the cell dimensions into which the target and candidate images have been divided (step 46 in FIG. 4). Summing the individual cell similarities generates an overall image similarity score for each candidate image. The candidate images are then sorted by their similarity scores to show which images are most similar to the target image. Typically, the target image itself is listed as the first similar image and it is assigned a baseline similarity score against which the scores of all of the candidate images may be compared. In this preferred embodiment, perfect similarity is arbitrarily initialized to zero, so this similarity score is assigned to each target image at the beginning of each search. The similarity score for each candidate image that is not identical to the target image will, in this example, be greater than zero. The higher the similarity score in this example, the greater the differences between the target and candidate image. One manner in which this process can be sped up, is to set an upper limit for the calculation of a similarity score. Where an image exceeds the upper limit, consideration of that image as a possible similar image will cease.

The similarity of each cell in a candidate image relative to the corresponding cell in the target image is calculated by determining a cosine differential and a sine differential between the corresponding cell intensity angles. In a preferred implementation, the cosine and sine differentials are then squared, added together, and multiplied by an arbitrary scaling factor. This scaled cell similarity may then be optionally adjusted to account for differences between the relative brightness and contrast in the target image cell compared to the corresponding candidate image cell. In other words, the individual cell similarity calculated by intensity angle differences alone may be scaled or weighted with regard to the relative brightness and contrast in the respective cells. Note that this last operation of adjusting the cell similarity based on relative brightness and contrast may be omitted.

Although the present invention has been described with reference to preferred embodiments, workers skilled in the art will recognize that changes may be made in form and detail without departing from the spirit and scope of the invention.

What is claimed is:

1. A method of generating a compact representation of a digital image, the method comprising: dividing the digital image into a plurality of cells; identifying a minimum intensity region in each cell in each set of the plurality of cells; identifying a maximum intensity region in each cell in each set of the plurality of cells; generating cell representation data for each cell in each set of cells based on the positions of the minimum intensity region and the maximum intensity region in that cell; and generating a persistent representation of the digital image, the representation including the cell representation data.

2. The method of claim 1, and further comprising converting the original digital image to a square bitmap prior to dividing the digital image into a plurality of cells.

3. The method of claim 1, and further comprising subdividing each cell into a plurality of regions.

4. The method of claim 3, and further comprising calculating a pixel intensity sum for each region, the pixel intensity sum for each region representing the sum of the intensities of the pixels contained in that region.

5. The method of claim 4, wherein the minimum and maximum intensity regions are identified based on the calculated pixel intensity sums.

6. The method of claim 1, and further comprising identifying cells that have low contrast, and associating a low contrast identifier with each identified cell.

7. The method of claim 6, wherein upon detection of an image having a predominance of low contrast cells, the image's contrast is dynamically increased and its cell representation data is recalculated.

8. The method of claim 6, wherein the low contrast identifier is a negative integer.

9. The method of claim 6, wherein the representation of the digital image includes the cell representation data.

10. The method of claim 1, wherein the intensity angle for each cell is generated based on an angle between a horizontal reference line and a line formed between the cell's minimum intensity region and its maximum intensity region.

11. The method of claim 10, wherein the cell representation data for each cell is an integer representing either the value of the intensity angle for the cell or the low contrast identifier.

12. A method of identifying candidate images in a library of digital images that are similar to a digital target image and determining a degree of similarity of the candidate images to the target image, the method comprising: dividing the digital target image and the digital source images in the library of digital images into a plurality of cells; identifying a minimum intensity region in each cell of the digital target and source images in the library; identifying a maximum intensity region in each cell of the digital target and source images in the library; generating cell representation data for each cell in each digital target and source image in the library based on the positions of the minimum intensity region and the maximum intensity region in the respective cells of the respective digital source and target images; generating a candidate image database that organizes the images according to the cell representation data of each source image; searching the candidate image database to identify candidate images having at least one cell that is similar to the target image; comparing the target image to each image from the candidate database identified as having at least one cell similar to the target image; and calculating similarity scores for the digital images with which the target image was compared.

13. The method of claim 12 wherein the candidate database is organized into a plurality of angle index categories, the number of categories corresponding to a transposed count of the number of possible cell representation data values, each category being further subdivided into a series of arrays, the number of arrays corresponding in number up to the number of cells into which each digital image has been divided, the arrays containing identifiers of those images having a cell representation datum corresponding to the value assigned to the current angle index category in a cell corresponding to the array associated with the angle index category.

14. A method of identifying candidate images among a library of source images that are similar to a target image, the method comprising: generating a representation of the target image and each of the source images based on the relative positions of a minimum and a maximum intensity region within the target and source images and wherein the representation of each of the target and source images is comprised of a plurality of intensity angles; generating a candidate image list, each candidate image having at least a predetermined degree of similarity with the target image; comparing the representations of the target image and the candidate images and generating a similarity score based on this comparison, the similarity score representing the degree of similarity of the digital images.

15. A method of claim 14 wherein the cell representation data from the first and the second digital images are compared on a cell by cell basis across a plurality of sets of cells.

16. The method of claim 14 and further comprising the step of transposing the plurality of intensity angles that comprise the representation of the target and the candidate digital images.

17. The method of claim 14 wherein the representation of each of the target and the candidate digital images is based on one or more image properties chosen from a list consisting of: intensity, color, hue, saturation, value, luminance, and chrominance.

18. A method of generating a compact representation of a digital image, the method comprising: dividing the digital image into a plurality of cells; identifying a minimum image data value region in each cell in each set of the plurality of cells; identifying a maximum image data value region in each cell in each set of the plurality of cells; generating persistent cell representation data for each cell in each set of cells based on the positions of the minimum image data value region and the maximum image data value region in that cell; and generating a representation of the digital image, the representation including the cell representation data.

19. The method of generating a compact representation of a digital image of claim 18 wherein the image data values are derived from one of a group consisting of: intensity, color, hue, saturation, value, luminance, and chrominance.

* * * * *